United States Patent [19]
Paradise

[11] Patent Number: 5,179,573
[45] Date of Patent: Jan. 12, 1993

[54] AMPLITUDE MEASUREMENT OF RECEIVED PSEUDONOISE SEQUENCE USING DIGITAL CORRELATION

[75] Inventor: Ronald Y. Paradise, Hillsdale, N.J.

[73] Assignee: GEC-Marconi Electronic Systems Corp., Wayne, N.J.

[21] Appl. No.: 834,811

[22] Filed: Feb. 13, 1992

[51] Int. Cl.⁵ .................. H04K 1/00; G01S 3/02
[52] U.S. Cl. ...................... 375/1; 342/145; 342/387
[58] Field of Search ............ 375/1; 342/134, 145, 342/189, 387

[56] References Cited

U.S. PATENT DOCUMENTS

| | | | |
|---|---|---|---|
| 3,714,573 | 1/1973 | Grossman | 375/1 |
| 4,466,010 | 1/1986 | Collins | 342/189 |
| 4,530,103 | 3/1987 | Nossen | 375/1 |
| 4,689,626 | 8/1987 | Hori et al. | 375/1 |
| 4,707,839 | 11/1987 | Andryn et al. | 375/1 |
| 4,758,839 | 7/1988 | Goebel | 342/145 |
| 4,979,183 | 12/1990 | Cowart | 375/1 |
| 5,029,180 | 7/1991 | Cowart | 375/1 |
| 5,128,961 | 7/1992 | Ueda et al. | 375/1 |

Primary Examiner—Salvatore Cangialosi
Attorney, Agent, or Firm—David L. Davis

[57] ABSTRACT

A system which utilizes a digital correlator to determine the time of arrival of a received pseudonoise sequence. At the same time, the incoming pseudonoise sequence is quantized to higher resolution and passed through a digital delay line with a total delay of slightly greater than the duration of the pseudonoise sequence itself. From the time of arrival measurement, a clock strobe timing is established to do active correlation on the delayed received sequence as it emerges from the delay line. The results of the active correlation are accumulated and/or added to obtain the amplitude of the received signal.

4 Claims, 1 Drawing Sheet

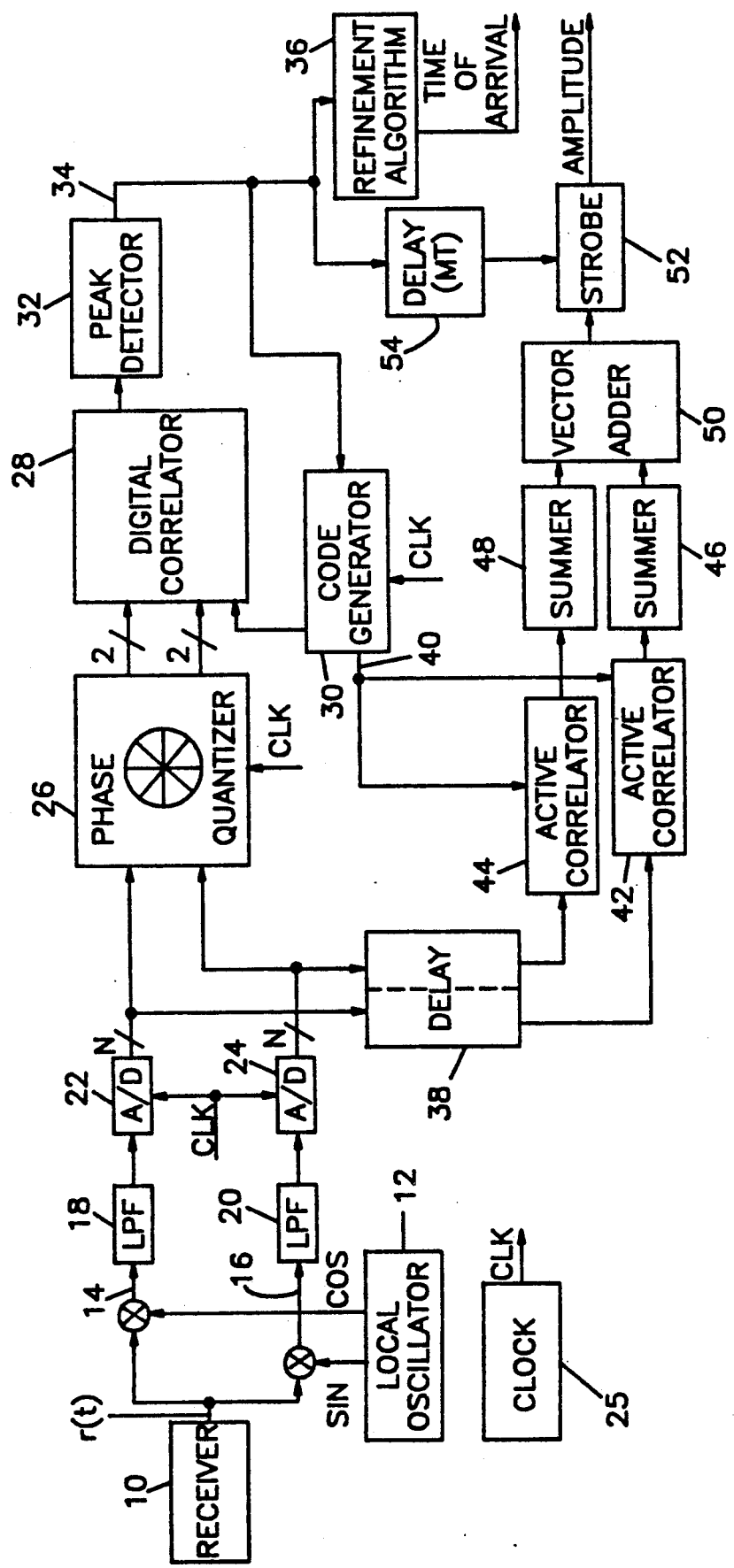

AMPLITUDE MEASUREMENT OF RECEIVED PSEUDONOISE SEQUENCE USING DIGITAL CORRELATION

BACKGROUND OF THE INVENTION

This invention relates to a radio frequency transmission and receiving system and, more particularly, to such a system wherein a phase modulated pseudonoise sequence signal is received. The signal may be the radar reflection off a target from a signal transmitted by the receiving system itself or may be a signal transmitted directly from another location, for example, a ground landing beacon.

The present invention finds utility in applications where it is required that the amplitude of the strongest signal be determined accurately. Such an application may be, for example, in landing systems, air traffic control systems, and monopulse radar systems. In such a system, a radio frequency carrier is phase modulated by a pseudonoise code. The code consists of a sequence of M binary bits chosen to be pseudo random and to have low auto-correlation values. The relative phase of the modulated signal during a particular interval is +90°, depending on the sign of the code element during that interval.

After the signal is received, it must be processed to determine not only its time of arrival but also its magnitude at that time of arrival so that the strongest received signal can be determined. Also, many such contiguous measurements may sometimes be required from a scanning beacon so that an accurate bearing angle can be estimated by determining, through interpolation, the virtual maximum. Digital correlation provides a relatively low cost technique for determining the time of arrival of the received signal. However, such a technique does not readily lend itself to providing the high resolution and linearity of amplitude measurement required in the aforedescribed applications. Accordingly, it is an object of the present invention to be able to use digital correlation techniques and obtain amplitude measurement in a cost effective manner.

SUMMARY OF THE INVENTION

The foregoing, and additional, objects are attained in accordance with the principles of this invention by providing an arrangement which strips the amplitude information from the received signal and uses a digital correlator to determine the time of arrival of the received signal. At the same time, the amplitude information is preserved and stored and, when the time of arrival is determined, the amplitude information is actively correlated to provide a precise measurement of the amplitude.

BRIEF DESCRIPTION OF THE DRAWING

The foregoing will be more readily apparent upon reading the following description in conjunction with the drawing in which the single figure is a block diagram of a system constructed in accordance with the principles of this invention.

DETAILED DESCRIPTION

Referring now to the drawing, the receiver 10 receives the signal which is an RF/IF carrier at the frequency $f_0$ which has been phase modulated by a pseudo noise code sequence. Illustratively, the modulation is Bi-Phase Shift Key (BPSK), but other modulation schemes such as MSK may be utilized as well. The input signal r(t) may be expressed in terms of the following equation:

$$r(t) = \cos(2\pi f_0 t + C_i \phi(t - iT))$$

where:
$\phi(t) =$
   {90°: $-T/2 < t < T/2$
   {0°: Elsewhere
$C_i = +1$ for $i = 1$ to M Thus, it is seen that the relative phase during the $i^{th}$ chip interval of duration T is +90° depending on the sign of the $i^{th}$ code element $C_i$, where the chip interval T is the period of the code clock. The code consists of M binary bits chosen to be pseudo-random and to have low auto-correlation values.

The received signal r(t) is split and mixed with sine and cosine signals generated from the local oscillator 12 at the frequency $f_0$ to generate in-phase and quadrature components of the input signal on the leads 14 and 16, respectively. The in-phase and quadrature components are then passed through conventional low pass anti-aliasing filters 18 and 20, respectively, and are then each converted to an N-bit digital representation by the analog to digital converters 22 and 24. The number of bits in the conversion is illustratively in the range of 8 to 12. Also, illustratively, the analog to digital conversion rate is one sample pair per chip interval, where the frequency of the clock 25 is 1/T.

According to this invention, two distinct functions are performed. The first is determining the precise time of arrival of the transmitted and reflected signal. The second function is to measure the relative amplitude of the incoming modulated signal. Since the received signal is not an instantaneously occurring signal, but rather is a sequence of received codes, the amplitude must be measured over the entire sequence.

According to this invention, the first function is done effectively with a low resolution digital correlator of minimal complexity. Since preservation of the incoming amplitude is not important in the measurement of time of arrival, it is only necessary to determine when the incoming phase code pattern matches the internally stored phase code pattern. This greatly simplifies the process but the amplitude information is lost. However, if the time of arrival were to be known, then a high resolution active correlation could be performed one chip at a time to preserve amplitude information without the need for a multi-chip high resolution physical correlator. The present invention contemplates doing this by storing and delaying a replica of the input data until its time of arrival has been determined by the method described above.

For time of arrival detection, the N bit in-phase and quadrature values are treated as components of a vector and requantized to fewer bits (i.e., two bits each in this example) by the phase quantizer 26. The phase quantizer 26 accomplishes this by comparing the two vector components to determine which of eight phase octants the received signal sample is in. This octant information can then be unambiguously encoded into only two bits for each component. The digitized phase quantized signals are then provided as inputs to the digital correlator 28, which includes two 2-bit wide and M-bit long digital correlators. The digital correlator 28 is preloaded from the code generator 30 with the pseudonoise code sequence. The outputs of the two correlators are squared and added together in the peak detector 32, which provides a signal on the lead 34 when this output peaks. The appearance of the signal on the lead 34 indicates a match between the stored code and the incoming signal, and is the initial estimate of the time of arrival, which is designated as time of peak. Since the time of peak is the time of arrival measurement only to the nearest clock time, a further refinement can be effected by the refinement algorithm 36, which fits a curve to the amplitudes of the outputs of the digital correlator 28 to the peak detector 32 to estimate the true peak time of arrival, which may be in between the clock pulse times. This represents the time of arrival of the last bit of the transmitted code and can be suitably adjusted to refer to any other reference times of the incoming signal.

While the aforedescribed digital correlation has been going on, the N-bit in-phase and quadrature components are stored and delayed by means of the delay circuit 38, which includes two N-bit wide and M-bit long shift registers. If all practical implementation delays such as the filters, phase quantizer logic and peak detector logic, are ignored, then at the time of peak the original in-phase and quadrature component data corresponding to the M-chip code will be stored in the delay 38 just ready to emerge. The time of peak pulse on the lead 34 triggers the code generator 30 to apply the code serially to the lead 40, to the active correlators 42 and 44. The delayed data is now actively, or serially, correlated. The emerging delayed in-phase and quadrature data is represented as serial binary data. The active correlators 42 and 44 simply invert or do not invert the data each chip time, depending on whether the serial code element $C_i$ is a 0 or 1 at that time. These are summed individually in the summers 46 and 48, respectively, and then vector added in the adder 50 by taking the square root of the sum of the squares to obtain the desired magnitude. This magnitude can be read out by being strobed by the strobe 52 at a time equal to the time of peak plus MT, as generated by the delay 54. This value is the desired reconstructed amplitude output for the overall received sequence signal. It is understood that additional delays can be added to the delay 38 to compensate for extra implementation delays in the time of arrival calculation circuitry that were ignored previously.

As described above, the sampling times occur only at 1/T intervals with a random timing phase which may be offset as much as T/2 from the optimum. One way to reduce the associated errors is to sample at twice the chip rate (i.e., every $\frac{1}{2}$T) and pick the maximum (odd or even) amplitude and corresponding time phase. While an improvement, this technique is disadvantageous in that it doubles the analog to digital conversion rate, the reconstruction memory speed and size, and the time of arrival speed and size. A reasonable compromise configuration would be to double the sample rate but avoid doubling the time of arrival correlator speed and size by estimating time of arrival from only odd (or even) samples and estimating the time of arrival by an existing interpolation algorithm and then picking the nearest clock phase samples (odd or even) for processing amplitude estimates. Further doubling of sample rate ($\frac{1}{4}$T) is feasible if accuracy requirements justify the increased hardware cost and complexity involved.

An alternate method may be employed to mitigate the amplitude error resulting from the fact that the nearest time sample may be offset as much as T/2 from the true peak. This method utilizes additional active correlator/summers to provide additional amplitude measurements for adjacent time samples. The sample time offset can then be corrected by means of interpolation among the measured amplitudes. For example, assume two additional active correlator/summer sets (44/48) are employed for the in-phase samples out of delay 38 and two more active correlator/summer sets (42/46) are employed for the quadrature samples out of delay 38. Then one each of the additional in-phase and quadrature sets will be correlated to the serial code on the lead 40 delayed one clock time and the other additional in-phase and quadrature set will be correlated to the serial code advanced one clock time. These correlations can all be applied sequentially to the vector adder 50 and its output will provide three contiguous amplitude measurements which bracket in time the "true" amplitude estimate. Conventional interpolation methods may then be applied to obtain the best estimate of the desired amplitude measurement. Additional help is available in this determination because the previous time of arrival refinement algorithm 36 will provide accurate time in between the sample times to use in the interpolation. The above method can be implemented with only a small addition in hardware and has the advantage of not requiring increased analog to digital sample rates or additional memory.

Accordingly, there has been disclosed a system for measuring the amplitude of a received pseudonoise sequence using digital correlation techniques. While a preferred embodiment has been disclosed herein, it will be apparent to those skilled in the art that various modifications and adaptations to the disclosed embodiment are possible, and it is intended that this invention be limited only by the scope of the appended claims.

I claim:

1. In a system where a phase modulated pseudo noise sequence signal is received, an arrangement for determining the time of arrival of the received signal and its amplitude at the time of arrival comprising:
   means for deriving in-phase and quadrature components of the received signal;
   means for converting the in-phase and quadrature components into digital form;
   means for quantizing the phase of the digitized components;
   means for providing said pseudo noise sequence in digital form as an ordered sequence of code elements;
   means for digitally correlating the phase quantized components with said digital pseudo noise sequence to obtain a time of arrival signal; and
   means for utilizing said digitized components and said time of arrival signal to calculate the amplitude of the received signal at the time of arrival.

2. The arrangement according to claim 1 wherein said utilizing means includes:
   means for delaying the digitized components by the length of the sequence;
   means initiated in response to said time of arrival signal for actively correlating the digitized components by multiplying each delayed digitized component by the corresponding code element of the digital pseudo noise sequence; and
   means for obtaining the vector sum of the result of the active correlation.

3. A method for determining the time of arrival and amplitude of a received phase modulated pseudonoise sequence signal, comprising the steps of:

(a) deriving the in-phase and quadrature components of the received signal;

(b) converting the components into digital form at a fixed conversion rate;

(c) storing the digitized components in a delay line corresponding to the sequence length;

(d) quantizing the phase of the digitized components;

(e) providing the pseudonoise sequence in digital form as an ordered sequence of code elements;

(f) digitally correlating the phase quantized components with the ordered sequence of code elements to obtain a time of arrival signal; and (g) utilizing the time of arrival signal to initiate active correlation of the stored digitized components with the ordered sequence of code elements so as to obtain the amplitude of the received sequence signal.

4. The method according to claim 3 where the step of utilizing includes the steps of:

(h) providing the ordered sequence of code elements in serial form at a rate equal to the fixed conversion rate;

(i) multiplying the ordered sequence of code elements one by one with the stored digitized components exiting the delay line;

(j) separately accumulating the results of the multiplying step for the in-phase and quadrature components; and (k) obtaining the vector sum of the accumulated results for the overall received sequence signal.

* * * * *